United States Patent [19]

Levinson

[11] Patent Number: 4,815,817

[45] Date of Patent: Mar. 28, 1989

[54] D-SHAPED FIBER

[75] Inventor: Frank H. Levinson, Redwood City, Calif.

[73] Assignee: Raynet Corporation, Menlo Park, Calif.

[21] Appl. No.: 178,177

[22] Filed: Apr. 6, 1988

[51] Int. Cl.$^4$ .............................................. G02B 6/22
[52] U.S. Cl. .................................................. 350/96.33
[58] Field of Search ................. 350/96.29, 96.30, 96.33

[56] References Cited

U.S. PATENT DOCUMENTS

| 3,823,997 | 7/1974 | Gloge et al. | 350/96 WG |
| 3,887,264 | 6/1975 | Kompfner | 350/96 WG |
| 4,054,366 | 10/1977 | Barnoski et al. | 350/96 C |
| 4,386,822 | 6/1983 | Bergh | 350/96.15 |
| 4,387,954 | 6/1983 | Beasley | 350/96.15 |
| 4,589,725 | 5/1986 | Dyott | 350/96.15 |
| 4,669,814 | 6/1987 | Dyott | 350/96.15 |
| 4,712,866 | 12/1987 | Dyott | 350/96.33 |

FOREIGN PATENT DOCUMENTS

| 0215674 | 3/1987 | European Pat. Off. | 350/96.33 |
| 251534 | 11/1986 | Japan | 350/96.33 |

Primary Examiner—William L. Sikes
Assistant Examiner—Robert E. Wise
Attorney, Agent, or Firm—Dennis E. Kovach; Herbert G. Burkard

[57] ABSTRACT

A D-shaped fiber which has an evanescent-field which is easily tapable has a low attenuation since a buffer material disposed on a cladding planar side of the waveguide has an index of refraction lower than the cladding so as to effectively increase a radius of the cladding in the vicinity of its planar side so as to minimize signal loss into the fiber buffer.

11 Claims, 2 Drawing Sheets

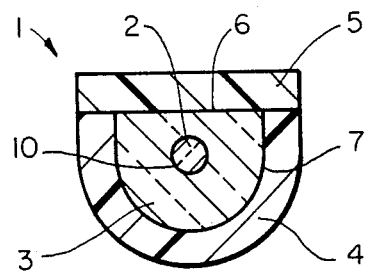
FIG_1
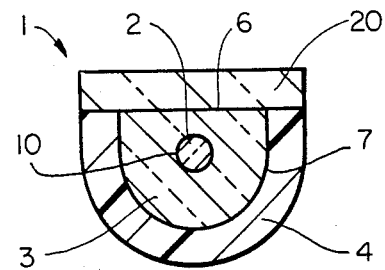
FIG_2
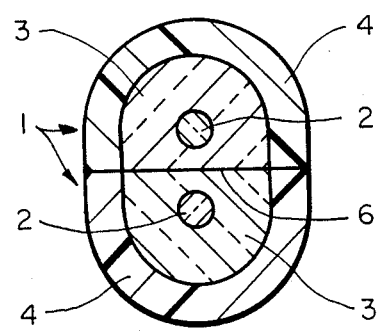
FIG_3
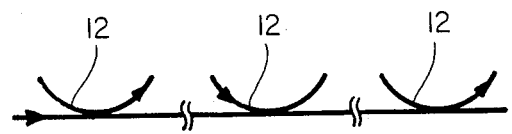
FIG_4

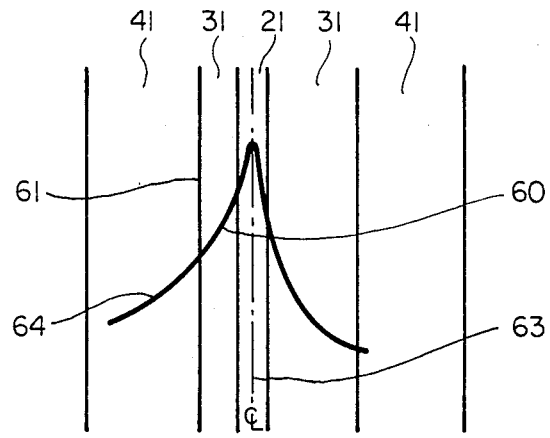
*FIG_5*
(PRIOR ART)
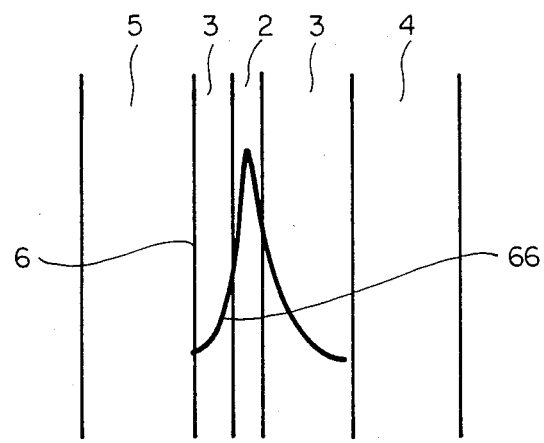
*FIG_6*

D-SHAPED FIBER

BACKGROUND OF THE INVENTION

The present invention relates to an optical fiber capable of having an optical signal evanescent-field easily coupled, and systems constructed therewith.

Various proposals have heretofore been made for forming optical fibers whose evanescent-field is readily coupled. In particular, a known type of geometry previously proposed is that one wherein a cladding which surrounds an optical fiber core has a substantially D-shaped profile, as disclosed in U.S. Pat. Nos. 4,589,725; 4,669,814; 4,387,954; 3,887,264; and 3,823,997, the disclosures of which are incorporated herein by reference. However, a common disadvantage of the D-shaped fibers constructed according to the teachings of these patents is that the fibers tend to be unduly lossy and accordingly not of significant practical use in view of the rather high attenuations thereof.

Accordingly, it has also been proposed to form D-sections in otherwise cylindrical fibers at localized regions for localized coupling, as disclosed in U.S. Pat. Nos. 4,386,822 and 4,054,366, the disclosures of which are incorporated herein by reference. However these proposals have the disadvantage that removing a portion of a cladding of an optical fiber at a localized section is an extremely craft sensitive operation in view of the extremely small diameter size of the cladding, e.g. on the order of 100–200 microns, and accordingly such procedures are not readily adaptable for use by a relatively untrained craftsman in outside plant environments.

SUMMARY OF THE INVENTION

Accordingly, it is an object of the invention to eliminate the above-noted drawbacks and to provide an optical fiber which has a low loss and which is easily tapable.

These and other objects are achieved by an optical fiber which includes a buffer having at least two different indexes of refraction, one relatively low index of refraction for reducing a signal loss through a tapable planar side of the fiber, and one relatively high index of refraction for stripping cladding modes from the cladding to preserve fiber bandwidth.

Specifically, the invention includes an optical fiber which comprises:
a core; a cladding surrounding the core, the cladding having an index of refraction less than the core so as to form a waveguide therewith, the cladding having at least one substantially planar side along substantially an entire length of the optical fiber, the core being located sufficiently close to the cladding planar side to allow evanescent-field coupling of an optical signal from the core through the cladding planar side; and a polymeric buffer surrounding the cladding, the buffer having an index of refraction lower than the cladding adjacent the cladding planar side and having an index of refraction higher than the cladding adjacent at least some other portions of the cladding.

The invention further includes methods of using such fiber, and in particular methods of forming bus and ring distributive architectures using such fiber.

BRIEF DESCRIPTION OF THE DRAWINGS

FIG. 1 is a cross-sectional view of a first embodiment of an optical fiber constructed according to a first embodiment of the invention;

FIGS. 2 and 3 are cross-sectional views of two embodiments of tapping the optical fiber illustrated in FIG. 1;

FIG. 4 illustrates a bus network according to the invention;

FIG. 5 illustrates a field intensity of a prior art single mode D-shaped fiber optical signal; and FIG. 6 illustrates a field intensity of a single mode D-shaped fiber optical signal according to the present invention.

DESCRIPTION OF THE PREFERRED EMBODIMENTS

Referring to FIG. 1, there is shown a first preferred embodiment of the invention. An optical fiber 1 includes a core 2 surrounded by a cladding 3, the core having an index of refraction higher than that of the cladding so as to form a waveguide, as is well understood in the art, the core and cladding preferably being made of silica and forming a single mode or monomode fiber.

According to the structure shown in FIG. 1, the cladding 3 has what is known in the art as a D-shaped profile so as to include a substantially planar surface 6 which together with a substantially semicircular or semicylindrical surface 7 completely surrounds the core 2. According to the invention, the core 2 is located sufficiently close to the cladding planar surface 6 so as to allow evanescent-field coupling to and from the core by disposing a material 20 (FIG. 2) having an index of refraction greater than the cladding adjacent the cladding planar surface 6 subsequent to removing a buffer 5 located adjacent the planar surface 6.

To prevent a leakage portion of an optical signal from being trapped in the cladding, it is common in the prior art to surround the cladding with a buffer material having an index of refraction greater than that of the cladding so as to strip any leakage light from the cladding into the buffer where it is quickly attenuated over distance due to the optical lossy characteristics of the buffer, which is generally a soft compliant polymer, typically an acrylate or silicone material. If the buffer does not have an index of refraction higher than the cladding, then cladding modes would be supported by the fiber which significantly adversely affects the bandwidth of the fiber due to time-of-arrival dispersion differences between modes supported by the cladding and those of the core.

It has been surprisingly discovered that the buffer material in a vicinity of the planar surface 6 of the cladding 3 is responsible for a majority of the light attenuation experienced by such D-shaped fibers over distance since an undue proportion of the optical signal is coupled into this buffer portion by evanescent-field coupling.

According to the invention, this disadvantage is alleviated by forming the buffer so as to have a composite structure. Specifically, the buffer has a composition in a region 4 adjacent the cylindrical cladding surface 7 which has an index of refraction higher than that of the cladding so as to efficiently strip light from the cladding so as to preserve fiber bandwidth, as required, with the buffer section 5 adjacent the cladding planar surface having an index of refraction lower than that of the cladding so as to effectively increase a radius of the cladding in a region of the planar surface 6 so as to minimize evanescent-field coupling from the fiber core 2 into the buffer section 5 adjacent the planar side 6.

More specifically, FIG. 5 illustrates a typical field intensity 60 of a single mode D-shaped fiber optical signal according to prior art D-shaped fiber constructions. Specifically, since buffer 41 adjacent planar side 61 of cladding 31 which surrounds core 21 has a higher index of refraction than the cladding 31, the field intensity 50 is skewed so as to peak in a portion of the core 21 closest to the cladding planar side 61, e.g. to the left of core centerline 63, as illustrated. As can be seen, a significant portion of an evanescent-field 64 of the field intensity 60 propagates in the buffer 41 adjacent to planar side 61 due to the index of refraction of the buffer 41 being higher than the cladding 31 around portions of the core excluding the cladding planar side portion. Since the buffer is a polymer and is very lossy in comparison to the glass core 21 and glass cladding 31, such fiber has significantly high attenuations.

However, according to the invention, since the buffer 5 adjacent the planar surface 6 has an index of refraction lower than the cladding 3, the field intensity 66 of the optical signal and the D-shaped fiber of the invention is skewed away from the planar side 6 so that the evanescent tail thereof is almost exclusively contained within the fiber cladding and not the buffers 5, 4, and hence much lower attenuations result.

With such a structure, a light signal is effectively kept within the waveguide with a minimum amount of signal attenuation over distance since the buffer 5 effectively forms an enlarged cladding adjacent the planar side 6 so as to prevent any significant evanescent-field coupling through the surface 6. However, wherever a tap or coupler is desired, a craftsman simply strips a short length of the buffer 5 from the planar side 6, and disposes a coupling medium 20 thereat having an index of refraction substantially the same as or higher than the cladding which allows a signal to be coupled into or from the core 2 by tapping the field evanescent tact which then would be skewed to the planar side of the fiber. Hence reading or writing is effectively accomplished, as desired.

A preferred embodiment is illustrated in FIG. 3 which shows two fibers 1 which have had their buffers 5 removed and their cladding planar sides disposed in contact and secured together. Accordingly, a portion of a signal in one of the fiber cores is thus coupled to the other fiber core, a length of the coupling region determining the exact coupling ratio.

FIG. 4 illustrates a preferred distribution system whereby a plurality of taps 2 are disposed serially along the D-shaped fiber, the taps also preferably having a D-shape, as described. The invention allows a ready means of forming optical buses or rings with taps in series, either read or write.

Though the invention has been described by reference to certain preferred embodiments thereof, it is not to be limited thereby and only by the appended claims.

What is claimed is:
1. An optical fiber, comprising:
a core;
a cladding surrounding the core, the cladding having an index of refraction less than the core so as to form a waveguide therewith, the cladding having at least one substantially planar side along substantially an entire length of the optical fiber, the core being located sufficiently close to the cladding planar side to allow evanescent-field coupling of an optical signal from the core through the cladding planar side;
a polymeric buffer surrounding the cladding, the buffer having an index of refraction lower than the cladding adjacent the cladding planar side and having an index of refraction higher than the cladding adjacent at least some other portions of the cladding.

2. The optical fiber of claim 1, the cladding having a partially cylindrical surface which together with the cladding planar surface completely surrounds the core, the core being located sufficiently far from the cladding cylindrical surface so as to prevent any significant evanescent-field coupling of the optical signal through the cladding semicircular surface.

3. The optical fiber of claim 1, the core and cladding being made of silica.

4. The fiber of claim 1, the cladding having a substantially D-shaped cross-sectional profile.

5. A method of distributing optical signals, comprising the steps of:
supporting an optical signal in an optical fiber which includes a core surrounded by a cladding, the cladding having an index of refraction less than the core so as to form a waveguide therewith, the cladding having at least one substantially planar side along an entire length thereof, the core being located closer to the cladding planar side than a cladding cylindrical side, the fiber further including a buffer surrounding the cladding, the buffer having an index of refraction lower than the cladding adjacent the cladding planar side and having an index of refraction higher than the cladding adjacent at least some other portions of the cladding;
removing the optical fiber buffer adjacent the cladding planar side at at least one select region of the optical fiber;
disposing a material having a coupling index of refraction on the cladding planar side at the select region.

6. The method of claim 5, further comprising the step of removing the optical fiber buffer adjacent the cladding planar side at a plurality of regions separated linearly along the fiber, and disposing the material at the plurality of regions.

7. The method of claim 6, further comprising the step of withdrawing a part of the optical signal from the optical fiber core at the plurality of regions.

8. The method of claim 6, further comprising the step of injecting separate optical signals into the optical fiber core at the plurality of regions.

9. The method of claim 6, further comprising the step of forming a bus architecture network.

10. The method of claim 5, the material comprising a second optical fiber which includes a second cladding having at least one substantially planar side along an entire length thereof, a core of the second fiber being located closer to its cladding planar side than a cylindrical side thereof, the second fiber having its cladding planar side disposed in contact with the planar side of the first optical fiber.

11. The method of claim 5, the material comprising a substantially planar cladding of a second waveguide, the second waveguide including a core located sufficiently close to its cladding planar side so as to allow evanescent-field coupling of an optical signal through the cladding planar side of the second waveguide core.

* * * * *